US00RE34697E

United States Patent [19]

Takada et al.

[11] E Patent Number: Re. 34,697

[45] Reissued Date of Patent: Aug. 16, 1994

[54] SILVER HALIDE PHOTOGRAPHIC LIGHT-SENSITIVE MATERIAL

[75] Inventors: Shun Takada; Kaoru Onodera; Takashi Kadowaki, all of Odawara, Japan

[73] Assignee: Konishiroku Photo Industry Co., Ltd., Tokyo, Japan

[21] Appl. No.: 528,327

[22] Filed: May 29, 1990

Related U.S. Patent Documents

Reissue of:

[64] Patent No.: 4,537,857
Issued: Aug. 27, 1985
Appl. No.: 556,129
Filed: Nov. 29, 1983

U.S. Applications:

[63] Continuation of Ser. No. 326,782, Mar. 21, 1989, abandoned.

[30] Foreign Application Priority Data

Nov. 30, 1982 [JP] Japan ..... 57-210219

[51] Int. Cl.[5] ..... G03C 7/26

[52] U.S. Cl. ..... 430/549; 430/505; 430/552; 430/553; 430/555; 430/556; 430/557; 430/558

[58] Field of Search ..... 430/549, 552, 553, 505

[56] References Cited

U.S. PATENT DOCUMENTS

| | | | |
|---|---|---|---|
| 3,476,563 | 11/1969 | Loria | 430/553 |
| 4,334,011 | 6/1982 | Aoki et al. | 430/553 |
| 4,374,922 | 2/1983 | Ohbayashi et al. | 430/383 |
| 4,427,767 | 1/1984 | Aoki et al. | 430/553 |
| 4,434,225 | 2/1984 | Sagita et al. | 430/553 |
| 4,450,228 | 5/1984 | Shimba et al. | 430/553 |
| 4,455,367 | 6/1984 | Seoka et al. | 430/553 |
| 4,456,681 | 6/1984 | Kadowaki et al. | 430/553 |
| 4,552,836 | 11/1985 | Tanabe et al. | 430/549 |
| 4,613,564 | 9/1986 | Takada et al. | 430/549 |
| 4,613,565 | 9/1986 | Takada et al. | 430/549 |
| 4,614,710 | 9/1986 | Takada et al. | 430/549 |

FOREIGN PATENT DOCUMENTS

| | | |
|---|---|---|
| 56-55945 | 5/1981 | Japan . |
| 57-142640 | 9/1982 | Japan . |

*Primary Examiner*—Richard L. Schilling
*Attorney, Agent, or Firm*—Finnegan, Henderson, Farabow, Garrett, and Dunner

[57] ABSTRACT

A silver halide light-sensitive material having a support and at least one silver halide emulsion is provided. The silver halide emulsion layer contains in combination at least one cyan coupler of Formula (I) and at least one cyan coupler of Formula (II).

20 Claims, No Drawings

SILVER HALIDE PHOTOGRAPHIC LIGHT-SENSITIVE MATERIAL

Matter enclosed in heavy brackets [ ] appears in the original patent but forms no part of this reissue specification; matter printed in italics indicates the additions made by reissue.

*This application is a continuation of application Ser. No. 07/326,782 filed Mar. 21, 1989 now abandoned.*

DETAILED DESCRIPTION OF THE INVENTION

The present invention relates to a silver halide photographic light-sensitive material, and more particularly to a silver halide photographic light-sensitive material which contains a cyan coupler excellent in the solubility as well as in the dispersion stability and which is capable of giving a satisfactorily color-reproducible and well-preservable dye image.

The formation of a dye image by use of a silver halide color photographic light-sensitive material is generally carried out in the manner that an aromatic primary amine color developing agent itself, when reducing the light-exposed silver halide particles of a silver halide color photographic light-sensitive material, is oxidized, and the oxidized product reacts with a coupler that is in advance contained in the silver halide color photographic light-sensitive material to thereby form a dye. And as the coupler, because the color reproduction is usually carried out by the color subtractive process, three different couplers; i.e., yellow, magenta and cyan couplers are used.

These couplers each is normally dissolved in a substantially water-insoluble high-boiling organic solvent or at need together with an auxiliary solvent, and the resulting solution is then adder to a silver halide emulsion.

Fundamental requirements for the nature of these couplers are that the coupler shall:

have large solubility in high-boiling organic solvents, have no satisfactory dispersibility and dispersion stability that the coupler is hardly deposited, be so excellent in the spectral absorption characteristics as well as in the color tone that a clear dye image can be formed in a wide color reproduction range, and form a dye image which is highly resistant to light, heat and moisture. Especially, the cyan coupler should be improved on two points: one is that it should have litte or no absorption in the wavelength region other than its intrinsic spectral absorption wavelength region, and the other is that it should have higher resistance to light, heat and moisture.

Those conventionally known cyan couplers include 2,5-diacylaminophenol-type cyan couplers which are phenol compounds the second and fifth positions of which are substituted by acylamino radicals, as described in, e.g., U.S. Pat. No. 2,985,826, Japanese Patent Publication Open to Public Inspection (hereinafter referred to as Japanese Patent O.P.I. Publication) Nos. 112038/1975, 109630/1978 and 163537/1980. When such a 2,5-diacylaminophenol-type cyan coupler is used in a silver halide light-sensitive material, because of its very small secondary adsorption in the spectral wavelength range of from 400 to 450 nm, the light-sensitive material becomes better in the blue color reproduction as well as in the color restoration (cyan dye loss in prevented), and further becomes better improved on the dark discoloration resistance such as the resistance to heat and moisture, so that the light-sensitive material can be largely improved on the cyan dye image. However, the use of a 2,5-diacylaminophenol-type cyan coupler can not sufficiently satisfy the foregoing fundamental nature requirements because the coupler has the disadvantages that (1) its spectral minimum density in the wavelength range of from 450 to 480 nm is so high and its lightness is so low that its color reproducible range becomes narrow, while its absorption in the wavelength range of from 500 to 550 nm is so high that its green color reproduction becomes poor, (2) its resistance to light is insufficient, and (3) its solubility and dispersion ability are unsatisfactory.

It is therefore a first object of the present invention to provide a silver halide photographic light-sensitive material containing a cyan coupler which is excellent in the spectral absorption characteristic and capable of forming a clear dye image with good color tone in a wide color reproduction range.

It is a second object of the present invention to provide a silver halide photographic light-sensitive material which is improved so as to have well balanced resistances to light, heat and moisture, and capable of forming a well preservable dye image.

It is a third object of the present invention to provide a silver halide photographic light-sensitive material containing a cyan coupler which is excellent in the solubility, dispersibility and dispersion stability.

We have now found that the above objects of the present invention can be accomplished by a silver halide photographic light-sensitive material comprising a support having thereon at least one silver halide emulsion layer containing in combination at least one of those cyan couplers having the following Formula [I] and at least one of those cyan couplers having the following Formula [II], and thus we have completed the present invention.

Formula [I]

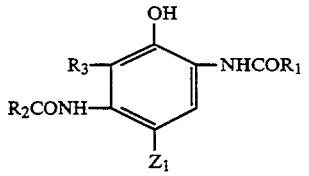

wherein $R_1$ represents an aryl radical, a cycloalkyl radical or a heterocyclic radical; $R_2$ represents an alkyl radical or a phenyl radical; $R_3$ is a hydrogen atom, a halogen atom, an alkyl radical or an alkoxy radical; and $Z_1$ is hydrogen atom, a halogen atom, or a radical that can be split off by the reaction of the coupler with the oxidized product of an aromatic primary amine-type color developing agent.

Formula [II]

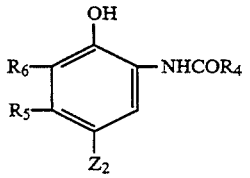

wherein $R_4$ is an alkyl radical (such as methyl, ethyl, butyl, nonyl, etc.); $R_5$ is an alkyl radical (such as methyl, ethyl, etc.); $R_6$ is a hydrogen atom, a halogen atom (such as fluorine, chlorine, bromine, etc.) or an alkyl radical (such as methyl, ethyl, etc.); and $Z_2$ is a hydrogen atom, a halogen atom, or a radical that can be split off by the reaction of the coupler with the oxidized product of an aromatic primary amine-type color developing agent.

In the present invention, the aryl radical represented by $R_1$ of Formula [[I]] *I* includes, e.g., phenyl, naphthyl, and preferably phenyl. The heterocyclic radical represented by $R_1$ includes, e.g., pyridyl, furan, etc. The cycloalkyl radical represented by $R_1$ includes, e.g., cyclopropyl, cyclohexyl, etc. These radicals represented by $R_1$ are allowed to have a single or a plurality of substituents; for example, those typical substituents introducible to the phenyl include halogens (such as fluorine, chlorine, bromine, etc.), alkyl radicals (such as, e.g., methyl, ethyl, propyl, butyl, dodecyl, etc.), hydroxy radical, cyano radical, nitro radical, alkoxy radicals (such as, e.g., methoxy, ethoxy, etc.), alkyl-sulfonamido radicals (such as, e.g., methyl-sulfonamido, octyl-sulfonamido, etc.), aryl-sulfonamido radicals[)] (such as, phenylsulfonamido, naphthylsufonamido, etc.), alkyl-sulfamoyl radicals (such as, e.g., butyl-sulfamoyl, etc.), aryl-sulfamoyl radicals (such as, e.g., phenyl-sulfamoyl, etc.), alkoxycarbonyl radicals (such as, e.g., methyloxycarbonyl, etc.), aryloxycarbonyl radicals (such as, e.g., phenyloxycarbonyl, etc.), aminosulfonamido radical, acylamino radicals, carbamoyl radical, sulfonyl radical, sulfinyl radical, sulfoxy radical, sulfo radical, aryloxy radicals, alkoxy radicals, carboxyl radical, alkyl-carbonyl radicals, aryl-carbonyl radicals, aminocarbonyl radical, and the like. Not less than two of these substituents may be introduced to the phenyl radical. The preferred radicals represented by $R_1$ include phenyl radical or *phenyl radicals having a single or a plurality of substituents* (*which are typified by* halogens, alkyl-sulfonamido radicals, aryl-sulfonamido radicals, alkyl-sufamoyl radicals, aryl-sulfamoyl radicals, alkyl-sulfonyl radicals, aryl-sulfonyl radicals, alkyl-carbonyl radicals, aryl-carbonyl radicals, and [phenyl radicals having one or not less than two] cyano radicals [as substituents]).

The alkyl radical represented by $R_2$ includes those in the straight chain or branched chain form, such as methyl, ethyl, propyl, butyl, octyl, and the like radicals.

The preferred cyan couplers having Formula [[I]] *I* in the present invention include those compounds having the following Formula [[III]] *III*:

[

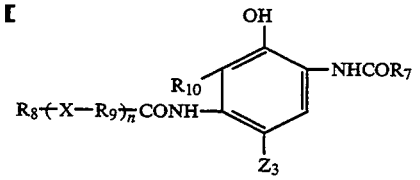

Formula [III]

]

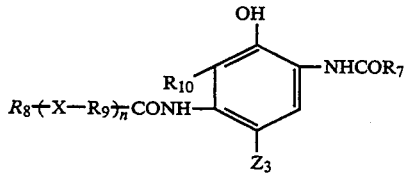

*Formula III* wherein $R_7$ represents a phenyl radical which is allowed to have a single or a plurality of substituents which are typified by a halogen atom (such as fluorine, chlorine, bromine, etc.), an alkyl radical (such as, e.g., methyl, ethyl, propyl, butyl, octyl, dodecyl, etc.), a hydroxy radical, a cyano radical, a nitro radical, an alkoxy radical (such as, e.g., methoxy, ethoxy, etc.), an alkyl-sulfonamido radical (such as, e.g., methyl-sulfonamido, octyl-sulfonamido, etc.), an aryl-sulfonamido radical (such as, e.g., phenyl-sulfonamido, [napththyl-sulfonamido] *naphthyl-sulfonamido*, etc.), an alkyl-sulfamoyl radical (such as, e.g., butyl-sulfamoyl, etc.), an aryl-sulfamoyl radical (such as, e.g., phenyl-sulfamoyl, etc.), an alkyloxycarbonyl radical (such as, e.g., methyloxycarbonyl, etc.), an aryloxycarbonyl radical (such as, e.g., phenyloxycarbonyl, etc.), and the like. Not less than two of these substituents may be introduced to the phenyl radical.

The preferred radical represented by $R_7$ is a phenyl radical [having such one substituent or not less than two substituents as phenyl radicals or] *or phenyl radicals having a single or a plurality of substituents* (*which are typified by* halogens (preferably fluorine or bromine), alkyl-sulfonamido radicals (preferably O-methyl-sulfonamido, p-octyl-sulfonamido, o-dodecyl-sulfonamido), aryl-sulfonamido radicals (preferably phenyl-sulfonamido), alkyl-sulfamoyl radicals (preferably butyl-sulfamoyl), aryl-sulfamoyl radicals (preferably phenyl-sulfamoyl), alkyl radicals (preferably methyl, trifluoromethyl), or alkoxy radicals (preferably methoxy, ethoxy)).

$R_8$ is an alkyl or aryl radical. The alkyl radical or the aryl radical is allowed to have a single or a plurality of substituents which may be typified by halogens (such as, e.g., fluorine, chlorine, bromine, etc.), hydroxyl radical, carboxyl radical, alkyl radicals (such as, e.g., methyl, [ethy] *ethyl*, propyl, butyl, octyl, dodecyl, etc.), aralkyl radicals, cyano radical, nitro radical, alkoxy radicals (such as e.g., methoxy, ethoxy, etc.), aryloxy radicals, alkyl-sulfonamido radicals (such as, e.g., methyl-sulfonamido, octyl-sulfonamido, etc.), aryl-sulfonamido radicals (such as, e.g., phenyl-sulfonamido, naphthyl-sulfonamido, etc.), alkyl-sulfamoyl radicals (such as, e.g., butyl-sulfamoyl, etc.), aryl-sulfamoyl radicals (such as, e.g., phenyl sulfamoyl, etc.), alkyloxycarbonyl radicals (such as, e.g., methyloxycarbonyl, etc.), aryloxycarbonyl radicals (such as e.g., phenyloxycarbonyl, etc.), aminosulfonamido radicals (such as, e.g., dimethylaminosulfonamido, etc.) alkyl-sulfonyl radicals, aryl-sulfonyl radicals, alkyl-carbonyl radicals, aryl-carbonyl radicals, aminocarbonylamido radical, carbamoyl radical, sulfinyl radical, and the like. Not less than two of these substituents may be introduced to the alkyl or aryl radical.

The preferred radical represented by $R_8$, when the n is equal to 0, is an alkyl and, when the n is equal to more than 1, is an aryl. The further preferred radical represented by $R_8$ is a phenyl radical having [such one substituent or not less than two] substituents as, when the n is equal to 0, alkyl radicals having from 1 to 22 carbon atoms (preferably methyl, ethyl, propyl, butyl, octyl, dodecyl) and, when the n is equal to one or more than 1, phenyl, or alkyl radicals (preferably t-butyl, t-amyl, octyl), alkyl-sulfonamido radicals (preferably butyl-sulfonamido, octyl-sulfonamido, dodecyl-sulfonamido), aryl-sulfonamido radicals (preferably phenyl-sulfonamido), aminosulfonamido radicals (preferably dimethylaminosulfonamido), or alkyloxycarbonyl radicals (preferably methyloxycarbonyl, butyloxycarbonyl).

*$R_9$ represents an alkylene radical.* $R_9$ represents a straight-chain or branched-chain alkylene having from 1 to 20 carbon atoms, and more preferably from 1 to 12 carbon atoms.

$R_{10}$ is a hydrogen atom or a halogen atom (fluorine, chlorine or bromine), and preferably a hydrogen atom.

n is 0 or [an] *a* positive integer and preferably 0 to 5, more preferably 0 to 1.

X is a divalent radical such as —O—, —CO—, —COO—, —OCO—, —$SO_2NR'$—, $NR'SO_2NR''$—, —S—, —SO— or —$SO_2$— wherein R′ and R″ each is a substituted or unsubstituted alkyl radical, and preferably —O—, —S—, —SO— and —$SO_2$—.

$Z_3$ is a hydrogen atom, a halogen atom, or a radical that can be split off by the reaction of the coupler with the oxidized product of an aromatic primary amine-type color developing agent, the radical being preferably a chlorine atom or a fluorine atom.

The following are typical examples of the cyan coupler having Formula [[I]] but the present invention is not limited thereto.

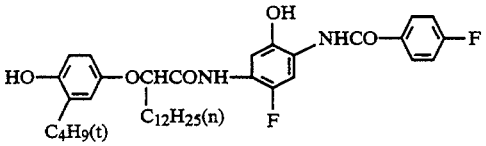
(I-1)

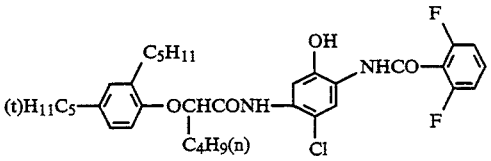
(I-2)

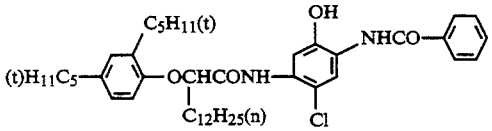
(I-3)

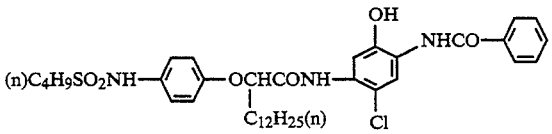
(I-4)

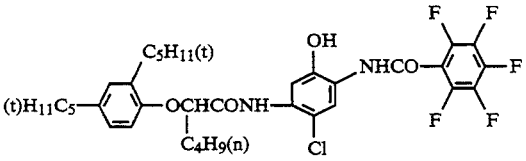
(I-5)

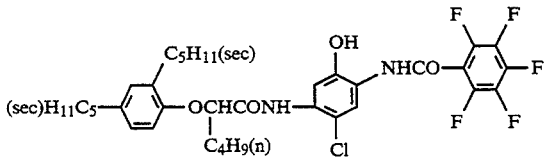
(I-6)

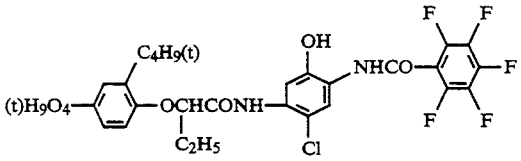
(I-7)

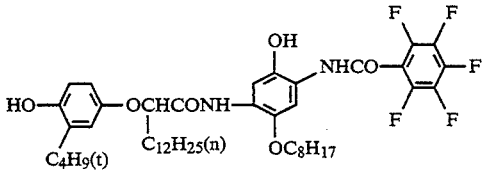
(I-8)

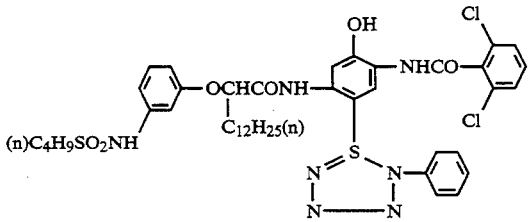
(I-9)

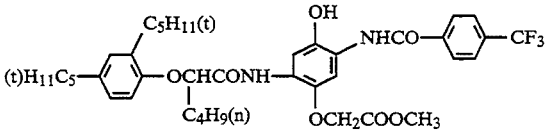
(I-10)

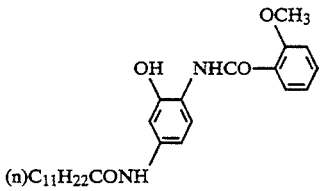
(I-11)

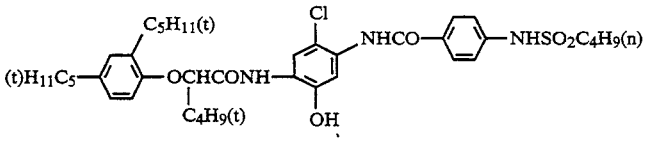
(I-12)

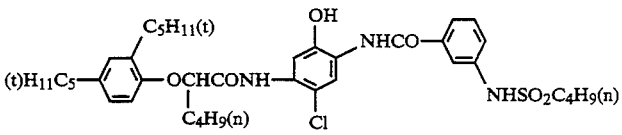
(I-13)

-continued
(I-14)
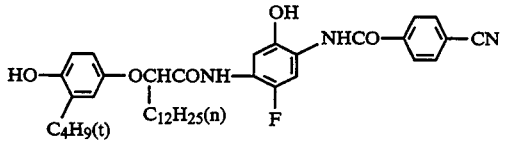
(I-15)
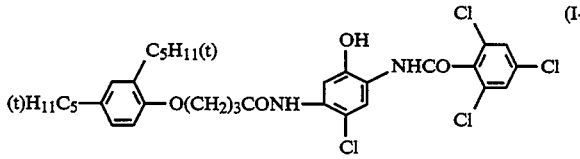
(I-16)
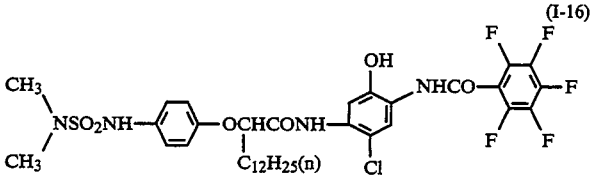
(I-17)
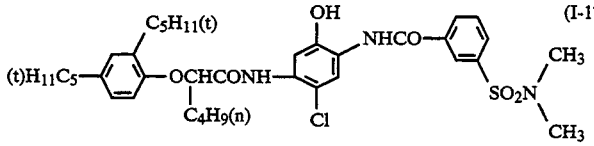
(I-18)
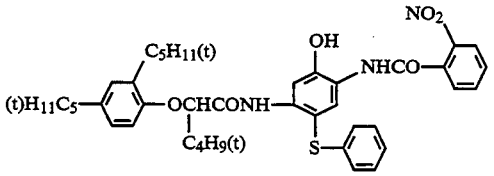
(I-19)
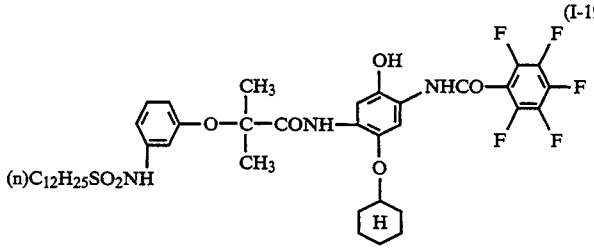
(I-20)
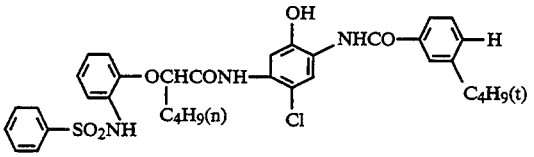
(I-21)
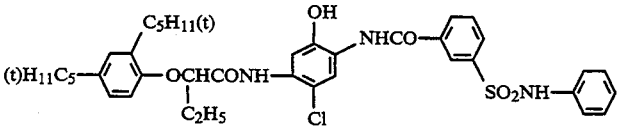
(I-22)
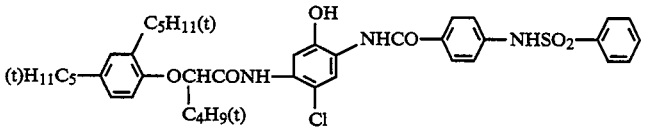
(I-23)
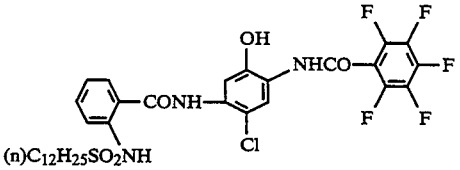
(I-24)
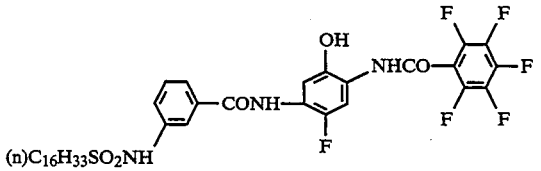
(I-25)
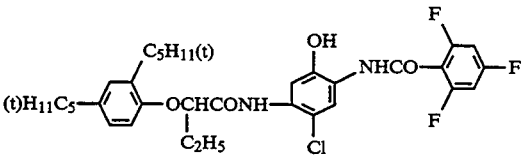
(I-26)
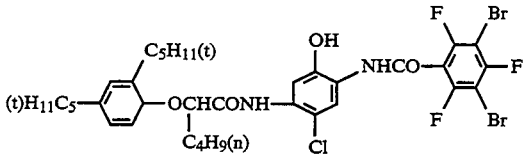
(I-27)
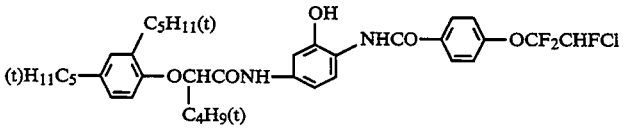
(I-28)
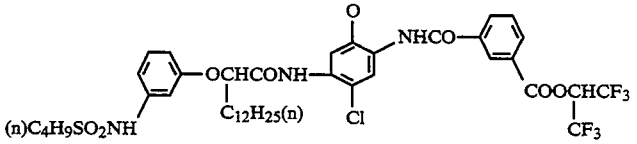

-continued
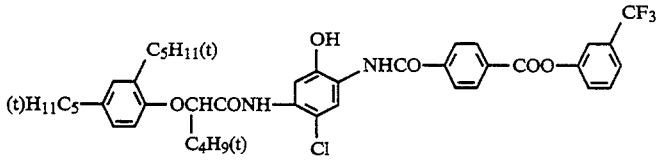
(I-29)
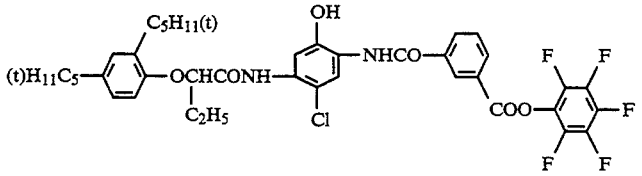
(I-30)
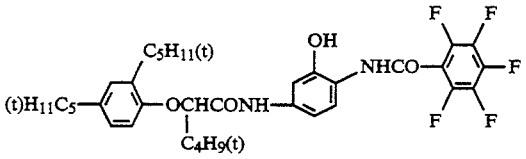
(I-31)
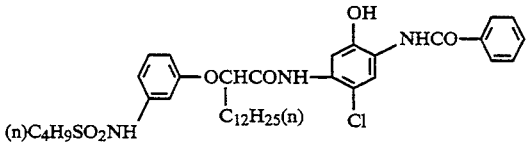
(I-32)
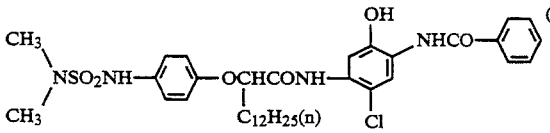
(I-33)
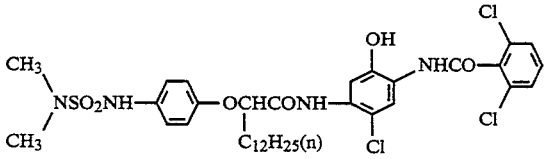
(I-34)
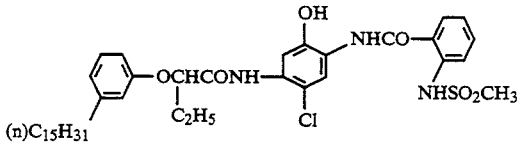
(I-35)
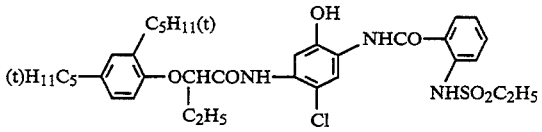
(I-36)
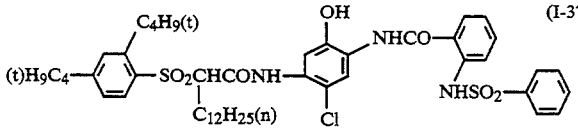
(I-37)
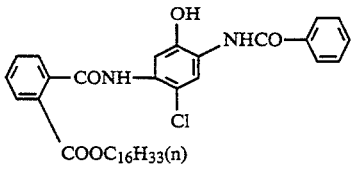
(I-38)
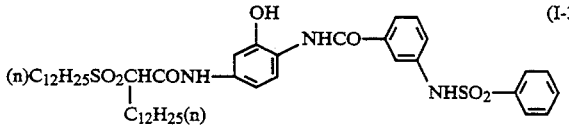
(I-39)
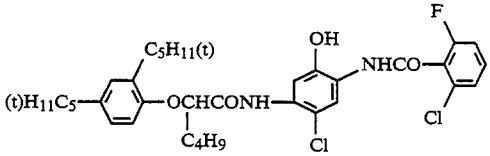
(I-40)
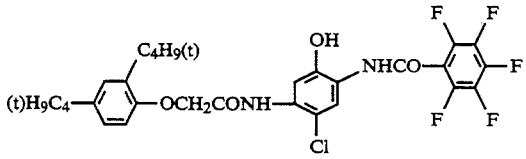
(I-41)
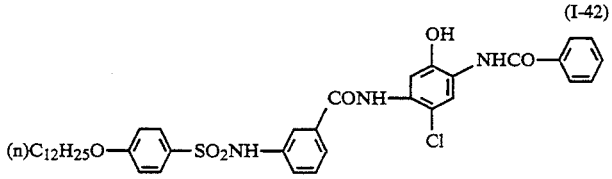
(I-42)
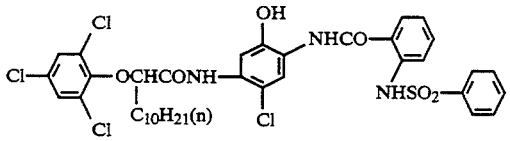
(I-43)
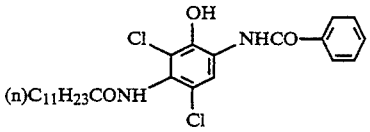
(I-44)

-continued (I-45)

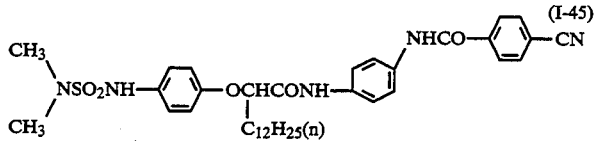

The cyan couplers having Formula [II] in the present invention are more preferably those compounds having the following Formula [IV]:

Formula [IV]

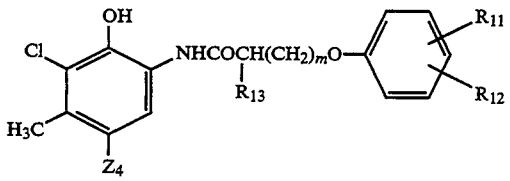

wherein $R_{11}$ and $R_{12}$ may be either the same or different from each other and each is a hydrogen atom, an alkyl radical (such as, e.g., methyl, ethyl, propyl, butyl, amyl, octyl, dodecyl, etc.) or an alkoxy radical (such as, e.g., methoxy, ethoxy, etc.), provided that the sum of the carbon atoms of $R_{11}$ and $R_{12}$ is from 8 to 16, and more preferably $R_{11}$ and $R_{12}$ each is a butyl or amyl radical; $R_{13}$ is a hydrogen atom or an alkyl radical (such as, e.g., methyl, ethyl, propyl, butyl, octyl, etc.), and preferably a hydrogen atom, ethyl or butyl radical; m is an integer of up to 2; and $Z_4$ is a hydrogen atom, a halogen atom, or a radical that can be split off by the reaction of the coupler with the oxidized product of an aromatic primary amine-type color developing agent.

In Formulas [I], [II], [III] and [IV], the radicals that can be split off by the reaction of these couplers with the oxidized product of the aromatic primary amine-type color developing agents represented by $Z_1$, $Z_2$, $Z_3$ and $Z_4$ are all known to those skilled in the art. Any of these radicals changes the reactivity of the coupler or is split from the coupler to fulfill its development-inhibiting, bleach-inhibiting and color-compensation functions to thereby advantageously act in the coupler-containing layers or other layers of the silver halide color photographic light-sensitive material. Typical examples of such radicals include, for example, alkoxy radicals, aryloxy radicals, arylazo radicals, thioether, carbamoyloxy radical, acyloxy radicals, imido radical, sulfonamido radical, thiocyano radical or heterocyclic radicals (such as, e.g., oxazolyl, diazolyl, triazolyl, tetrazolyl, etc.), and the like. The particularly preferred examples represented by Z are a hydrogen atom or a chlorine atom.

The following are typical examples of those cyan couplers having Formula [II], but the present invention is not limited thereto.

(I-47)

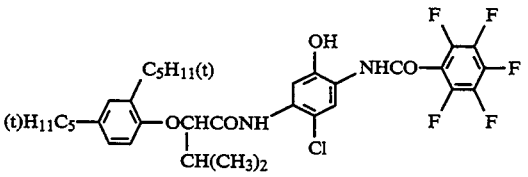

(I-46)

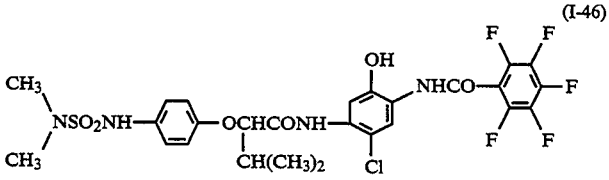

-continued (II-1)

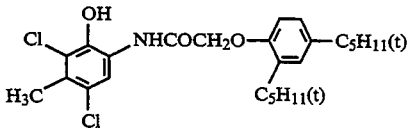

(II-2)

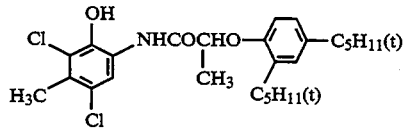

(II-3)

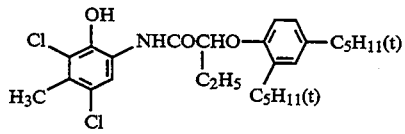

(II-4)

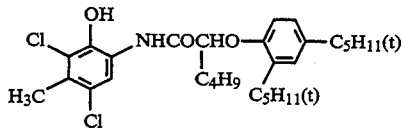

(II-5)

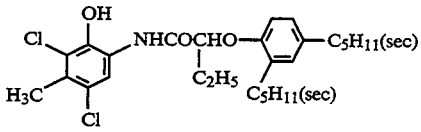

(II-6)

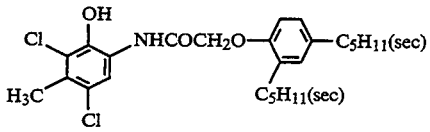

(II-7)

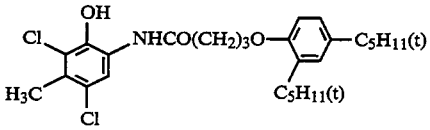

(II-8)

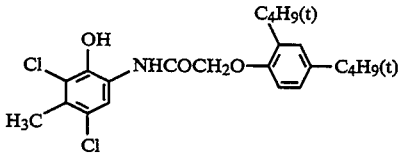

(II-9)

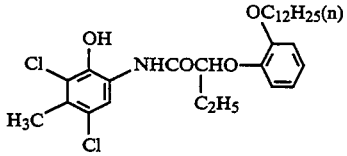

-continued (II-10)

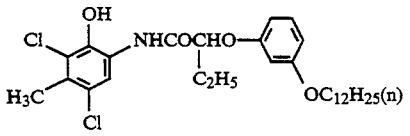

(II-11)

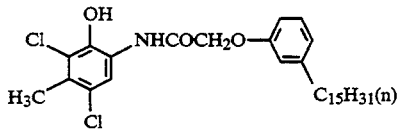

(II-12)

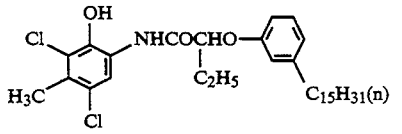

(II-13)

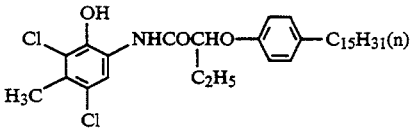

(II-14)

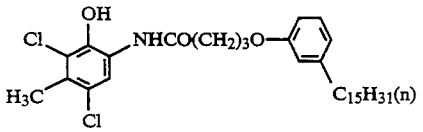

(II-15)

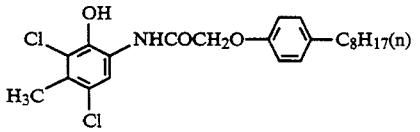

(II-16)

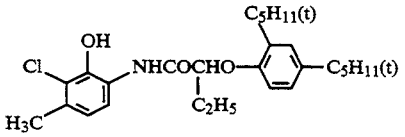

(II-17)

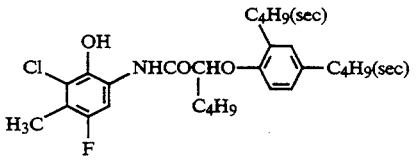

(II-18)

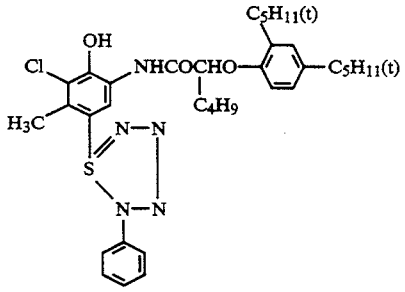

(II-19)

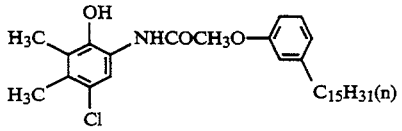

-continued (II-20)

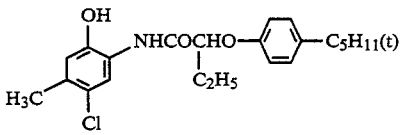

(II-21)

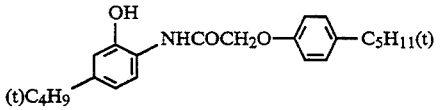

(II-22)

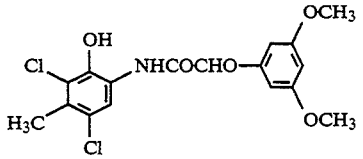

In the case of using in combination the cyan coupler having Formula [I] of the invention and the cyan coupler having Formula [II] of the invention, there may be used at least one of these cyan couplers having Formula [I] and at least one of these cyan couplers having Formula [II] in an arbitrary proportion in the combination thereof, but it is desirable that of the total amount of the cyan couplers the cyan coupler having Formula [II] be used in the quantity so as to account for from 30 to 90 mole%, and more preferably from 50 to 90 mole%.

The silver halide color photographic light-sensitive material of the present invention is allowed to be of any construction as long as it comprises a support having thereon at least one silver halide emulsion layer, and no particular restrictions are placed on the number of and the coating order of silver halide emulsion layers and non-light-sensitive layers. Typical examples of the light-sensitive material include color positive or negative films, color photographic printing papers, color slides, and those light-sensitive materials for special use such as for graphic arts use, radiography use, and high-resolution applications, and the like, and particularly suitable for use as color photographic printing papers. Most of the foregoing silver halide emulsion layers and non-light-sensitive layers are usually comprised of hydrophilic binder-containing hydrophilic colloidal layers. As the hydrophilic binder, there may be preferably used gelatin or gelatin derivatives such as acylated gelatin, guanidylated gelatin, carbamylated gelatin, cyanoethanolated gelatin, esterified gelatin, and the like.

These cyan couplers having Formulas [I] and [II] (hereinafter referred to as the cyan coupler(s) of the present invention) may be incorporated by the application of the method for use in ordinary cyan dye-forming couplers thereto into silver halide emulsion layers, the layers being coated on a support, thereby forming a photographic element. The photographic element is allowed to be either a monochromatic element or multicolor element. In the case of the multicolor element, the cyan coupler of the present invention is usually incorporated into the red-sensitive silver halide emulsion layer, but may be allowed in a nonlight-sensitive emulsion layer or emulsion layer that is sensitive to three-primary-color regions excluding the red. Each component unit capable of forming a dye image in the present invention is a single or one of a plurality of emulsion layers, having sensitivity to each given spectral region.

The cyan coupler of the present invention may be incorporated into an emulsion in accordance with any of conventionally known methods. For example, the cyan coupler is dissolved separately into such a single high-boiling organic solvent as a phthalate (dibutyl phthalate, etc.), a phosphate (tricresyl phosphate, etc.) or a N,N-dialkyl-substituted amide (N,N-diethyl-laurylamide, etc.) and into such a single low-boiling organic solvent as butyl acetate or butyl propionate, or dissolved into, if necessary, a mixture of the high-boiling and low-boiling organic solvents. After that, the solution is mixed with an aqueous gelatin solution containing a surfactant, and then emulsified to be dispersed by use of a high-speed mixer, a colloid mill or a ultrasonic disperser. The resulting dispersed liquid is subsequently added to a silver halide, whereby a silver halide emulsion for use in the present invention can be prepared.

The cyan coupler of the present invention may be added to the silver halide emulsion usually within the quantity range of from about 0.05 to about 2 moles per mole of silver halide, and preferably from 0.1 to 1 mole per mole of silver halide.

In the case where the silver halide color photographic light-sensitive material of the present invention is a multicolor element, all the layers including the above image forming component unit layers required for the photographic element may be coated in various orders as is known to those skilled in the art. The typical multicolor photographic element is one that comprises a support having thereon a cyan dye image-formable component unit consisting of at least one red-sensitive silver halide emulsion layer containing a cyan dye forming coupler (at least one of the cyan dye forming couplers is the cyan coupler of the present invention having Formula [I] and at least further one of the cyan couplers is the cyan coupler of the present invention having Formula [III]); a magenta dye image-formable component unit consisting of at least one green-sensitive silver halide emulsion layer containing at least one magenta dye forming coupler; and a yellow dye image-formable component unit consisting of at least one blue-sensitive silver halide emulsion layer containing at least one yellow dye forming coupler.

The photographic element may have additional layers; such nonlight-sensitive layers as filter layers, interlayers, a protective layer, an antihalation layer, a subbing layer, and the like.

As the yellow dye forming coupler usable in the present invention there may be suitably used those compounds having the following Formula [V]:

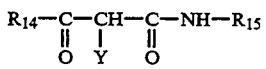

Formula [V]

wherein $R_{14}$ represents an alkyl radical (such as, e.g., methyl, ethyl, propyl, butyl, etc.) or an aryl radical (such as, e.g., phenyl, p-methoxyphenyl, etc.); $R_{15}$ represents an aryl radical; and Y represents a hydrogen atom or a radical which can be split off during the course of a color developing reaction).

Further, particularly preferred as the yellow coupler capable of forming a dye image in the present invention are those compounds having the following Formula [VI]:

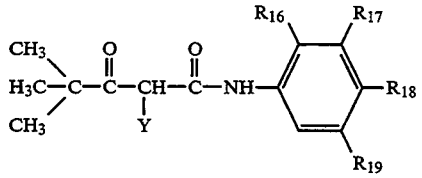

Formula [VI]

wherein $R_{16}$ is a halogen atom, an alkoxy radical or an aryloxy radical; $R_{17}$, $R_{18}$ and $R_{19}$ each is a hydrogen atom, a halogen atom, an alkyl radical, an alkenyl radical, an alkoxy radical, an aryl radical, an aryloxy radical, a carbonyl radical, a sulfonyl radical, a carbonyl radical, an alkoxycarbonyl radical, a carbonyl radical, a sulfone radical, a sulfamyl radical, a sulfonamido radical, an acylamido radical, an ureido radical or an amido radical; and Y is as defined previously.

These are as described in, for example, U.S. Pat. Nos. 2,778,658, 2,875,057, 2,908,573, 3,227,155, 3,227,550, 3,253,924, ,265,506, 3,277,155, 3,341,331, 3,369,895, 3,384,657, 3,408,194, 3,415,652, 3,447,928, 3,551,155, 3,582,322, 3,725,072, 3,894,875, West German OLS Patent Nos. 1,547,868, 2,057,941, 2,162,899, 2,163,812, 2,213,461, 2,219,917, 2,261,361, 2,263,875, Japanese Patent Examined Publication No. 13576/1974, Japanese Patent O.P.I. Publication Nos. 29432/1973, 66834/1973, 10736/1974, 122335/1975, 28834/1975 and 132926/1975, and the like.

As the magenta dye image forming coupler, there may be preferably used those couplers having the following Formula [VII]:

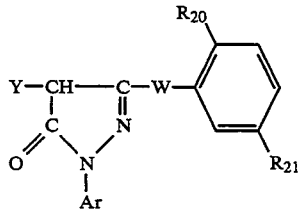

Formula [VII]

wherein Ar is an aryl radical; $R_{20}$ is a hydrogen atom, a halogen atom, an alkyl radical or an alkoxy radical; $R_{21}$ is an alkyl radical, an amido radical, an imido radical, an N-alkylcarbamoyl radical, an N-alkyl-sulfamoyl radical, an alkyloxycarbonyl radical, an acyloxy radical, a sulfonamido radical, or an urethane radical; Y is as defined in Formula [V]; and W is —NH—, —NHCO— (wherein the N atom is bonded with the carbon atom of pyrazolone nucleus) or —NHCONH—.

These are as described in, e.g., U.S. Pat. Nos. 2,600,788, 3,061,432, 3,062,653, 3,127,269, 3,311,476, 3,152,896, 3,419,391, 3,519,429, 3,555,318, 3,684,514, 3,888,680, 3,907,571, 3,928,044, 3,930,861, 3,930,866, 3,933,500, Japanese Patent O.P.I. Publication Nos. 29639/1974, 111631/1974, 129538/1974, 13041/1975, 58922/1977, 62454/1980, 118034/1980, 38043/1981, British Pat. No. 1,247,493, Belgian Pat. Nos. 769,116 and 792,525, West German Pat. No. 2,156,111, Japanese Patent Examined Publication No. 60479/1971, and the like.

The following are typical examples of the yellow and magenta dye image forming couplers which are suitably usable in the present invention, but the present invention is not limited thereto.

Yellow Couplers (Y-1) α-benzoyl-2-chloro-5-[α-(dodecyloxycarbonyl)ethoxycarbonyl]-acetanilide.

(Y-2) α-benzoyl-2-chloro-5-[γ-(2,4-di-t-amylphenoxy)-butylamido]-acetanilide.

(Y-3) α-fluoro-α-pivalyl-2-chloro-5-[α-(2,4-di-t-amylphenoxy)butylamido]-acetanilide.

(Y-4) α-pivalyl-α-stearoyloxy-4-sulfamoyl-acetanilide.

(Y-5) α-pivalyl-α-[4-(4-benzyloxyphenyl-sulfonyl)-phenoxy]-2-chloro-5-[γ-(2,4-di-t-amylphenoxy)-butylamido]-acetanilide.

(Y-6) α-(2-methoxybenzoyl)-α-(4-acetoxyphenoxy)-4-chloro-2-(4-t-octylphenoxy)-acetanilide.

(Y-7) α-pivalyl-α-(3,3-dipropyl-2,4-dioxo-acetidin-1-yl)-2-chloro-5-[α-(dodecyloxycarbonyl)-ethoxycarbonyl]-acetanilide.

(Y-8) α-pivalyl-α-succinimido-2-chloro-5-[γ-(2,4-di-t-amylphenoxy)butylamido]-acetanilide.

(Y-9) α-pivalyl-α-(3-tetradecyl-1-succinimido)-acetanilide.

(Y-10) Dipotassium α-(4-dodecyloxybenzoyl)-α-(3-methoxy-1-succinimido)-3,5-dicarboxyacetanilide.

(Y-11) α-pivalyl-α-phthalimido-2-chloro-5-[α-2,4-di-t-amylphenoxy)-butylamido]-acetanilide.

(Y-12) α-2-furyl-60-phthalimido-2-chloro-5-[γ-(2,4-di-t-amylphenoxy)-butylamido]-acetanilide.

(Y-13) α-3-[α-(2,4-di-t-amylphenoxy)-butylamido]-benzoyl-α-succinimido-2-methoxyacetanilide.

(Y-14) α-phthalimido-α-pivalyl-2-methoxy-4-[(N-methyl-N-octadecyl)-sulfamoyl]-acetanilide.

(Y-15) α-acetyl-α-succinimido-2-methoxy-4-[(N-methyl-N-octadecyl)-sulfamoyl]-acetanilide.

(Y-16) α-cyclobutyryl-α-(3-methyl-3-ethyl-1-succinimido)-2-chloro-5-[(2,5-di-t-amylphenoxy)acetamido]-acetanilide.

(Y-17) α-(3-octadecyl-1-succinimido)-α-propanoyl-acetanilide.

(Y-18) α-(2,6-di-oxo-3-n-propyl-piperidine-1-yl)-α-pivalyl-2-chloro-5-[α-(2,4-di-t-amylphenoxy)-butyl-carbamoyl]-acetanilide.

(Y-19) α-(1-benzyl-2,4-dioxo-imidazolidine-3-yl)-α-pivalyl-2-chloro-5-[γ-(2,4-di-t-amylphenoxy)-butylamido]-acetanilide.

(Y-20) α-(1-benzyl-2-phenyl-3,5-dioxo-1,2,4-triazine-4-yl)-α-pivalyl-2-chloro-5-[γ-(2,4-di-t-amylphenoxy)-butylamido]acetanilide.

(Y-21) α-(3,3-dimethyl-1-succinimido)-α-pivalyl-2-chloro-5-[α-(2,4-di-t-amylphenoxy)-butylamido]acetanilide.

(Y-22) α-[3-(p-chlorophenyl)-4,4-dimethyl-2,5-dioxo-1-imidazolyl]-α-pivalyl-2-chloro-5-[γ-(2,4-di-t-amylphenoxy)-butylamido]-acetanilide.

(Y-23) α-pivalyl-α-(2,5-dioxo-1,3,4-triazine-1-yl)-2-methoxy-5-[α-(2,4-di-t-amylphenoxy)-butylamido]-acetanilide.

(Y-24) α-(5-benzyl-2,4-dioxo-3-oxazoyl)-α-pivalyl-2-chloro-5-[γ-(2,4-di-t-amylphenoxy)-butylamido]-acetanilide.

(Y-25) α-(5,5-dimethyl-2,4-dioxo-3-oxazoyl)-α-pivalyl-2-chloro-5-[α-(2,4-di-t-amylphenoxy)-butylamido]-acetanilide.

(Y-26) α-(3,5-dioxo-4-oxadinyl)-α-pivalyl-2-chloro-5-γ-(2,4-di-t-amylphenoxy)-butylamido]-acetanilide.

(Y-27) α-pivalyl-α-(2,4-dioxo-5-methyl-3-thiazolyl)-2-chloro-5-[γ-(2,4-di-t-amylphenoxy)-butylamido]-acetanilide.

(Y-28) α-[3-(2H)-pyridazone-2-yl]-α-pivalyl-2-chloro-5-[γ-2,4-di-t-amylphenoxy)-butylamido]-acetanilide.

(Y-29) α-[4,5-dichloro-3(2H)-pyridazone-2-yl]-α-benzoyl-2-chloro-5-[α-(dodecyloxycarbonyl)-ethoxycarbonyl]-acetanilide.

(Y-30) α-(1-phenyl-tetrazole-5-oxy)-α-pivalyl-2-chloro-5-[γ-(2,4-di-t-amylphenoxy)-butylamido]-acetanilide.

(Y-31) 4,4′-di-(acetacetamino)-3,3-dimethyl-diphenylmethane.

(Y-32) P,P′-di-(acetacetamino)-diphenyl-methane.

Magenta Couplers (M-1) 1-(2,4,6-trichlorophenyl)-3-(2-chloro-5-octadecyl-carbamoyl-anilino)-5-pyrazolone.

(M-2) 1-(2,4,6-trichlorophenyl)-3-(2-chloro-5-tetradecanamidoanilino)-5-pyrazolone.

(M-3) 1-(2,4,6-trichlorophenyl)-3-[2-chloro-5-γ-(2,4-di-t-amylphenoxy)-butyl-carbamoyl]-anilino-5-pyrazolone.

(M-4) 1-(2,4,6-trichlorophenyl)-4-chloro-3-[2-chloro-5-γ-(2,4-di-t-amylphenoxy)-butyl-carbamoyl]-anilino-5-pyrazolone.

(M-5) 1-(2,4,6-trichlorophenyl)-4-diphenyl-methyl-3-[2-chloro-5-(γ-octadecenylsuccinimido)-propyl-sulfamoyl]-anilino-5-pyrazolone.

(M-6) 1-(2,4,6-trichlorophenyl)-4-acetoxy-5-(2-chloro-5-tetradecaneamido)-anilino-5-pyrazolone.

(M-7) 1-[γ-(3-pentadecylphenoxy)-butylamido]-phenyl-3-anilino-4-(1-phenyl-tetrazole-5-thio)-5-pyrazolone.

(M-8) 1-(2,4,6-trichlorophenyl)-3-(2-chloro-5-octadecylsuccinimido)-anilino-5-pyrazolone.

(M-9) 1-(2,4,6-trichlorophenyl)-3-(2-chloro-5-octadecenylsuccinimido)-anilino-5-pyrazolone.

(M-10) 1-(2,4,6-trichlorophenyl)-3-[2-chloro-5-(N-phenyl-N-octyl-carbamoyl)]-anilino-5-pyrazolone.

(M-11) 1-(2,4,6-trichlorophenyl)-3-[2-chloro-5-(N-butyl-carbonyl)-pyrazinyl-carbonyl]-anilino-5-pyrazolone.

(M-12) 1-(2,4,6-trichlorophenyl)-3-[2-chloro-5-(2,4-dicarboxy-5-phenyl-carbamoyl)-benzylamido]-anilino-5-pyrazolone.

(M-13) 1-(2,4,6-trichlorophenyl)-3-(4-tetradecyl-thiomethylsuccinimido)-anilino-5-pyrazolone.

(M-14) 1-(2,4,6-trichlorophenyl)-3-[2-chloro-4-(2-benzofurylcarboxyamido)]-anilino-5-pyrazolone.

(M-15) 1-(2,4,6-trichlorophenyl)-3-{2-chloro-4-[γ-(2,2-dimethyl-6-octadecyl-7-hydroxy-chroman-4-yl)-propionamido]}-anilino-5-pyrazolone.

(M-16) 1-(2,4,6-trichlorophenyl)-3-[2-chloro-5-(3-pentadecylphenyl)-phenylcarboamido]-anilino-5-pyrazolone.

(M-17) 1-(2,4,6-trichlorophenyl)-3-{2-chloro-5-[2-(3-t-butyl-4-hydroxyphenoxy)-tetradecanamido]-anilino}-5-pyrazolone.

(M-18) 1-(2,6-dichloro-4-methoxyphenyl)-3-(2-methyl-5-tetradecanamido)-anilino-5-pyrazolone.

(M-19) 4,4′-benzylidene-bis-[1-(2,4,6-trichlorophenyl)-3-{2-chloro-4-[γ-(2,4-di-t-amylphenoxy)-butylamido]-anilino}-5-pyrazolone.

(M-20) 4,4′-benzylidene-bis[1-(2,3,4,5,6-pentachlorophenyl-3-2-chloro-5-[γ-(2,4-di-t-amylphenoxy)-butylamido]-anilino]-5-pyrazolone.

(M-21) 4,4′-(2-chloro)-benzylidene-bis-[1-(2,4,6-trichlorophenyl)-3-(2-chloro-5-dodecylsuccinimido)-anilino]-5-pyrazolone.

(M-22) 4,4′-benzylidene-bis-[1-(2-chlorophenyl)-3-(2-methoxy-4-hexadecanamido)-anilino-5-pyrazolone].

(M-23) 4,4'-methylene-bis[1-(2,4,6-trichlorophenyl)-3-(2-chloro-5-dodecenylsuccinimido)-anilino-5-pyrazolone)].

(M-24) 1-(2,4,6-trichlorophenyl)-3-[3-(2,4-di-t-amylphenoxyacetamido)-benzamido]-5-pyrazolone.

(M-25) 3-ethoxy-1-4-[α-(3-pentadecenylphenoxy)-butylamido]-phenyl-5-pyrazolone.

(M-26) 1-(2,4,6-trichlorophenyl)-3-[2-chloro-5-{α-(3-t-butyl-4-hydroxy)-phenyl}-tetradecanamido]-anilino-5-pyrazolone.

(M-27) 1-(2,4,6-trichlorophenyl)-3,3-nitriloanilino-5-pyrazolone.

Any of these yellow dye forming couplers and magenta dye forming couplers may be incorporated into a silver halide emulsion layer within the quantity range of from 0.05 to 2 moles per mole of silver halide.

For the support of the light-sensitive material of the present invention, any of those materials may be used such as, for example, baryta paper, polyethylene-coated paper, polypropylene-synthetic paper, a transparent support material provided with a reflective layer or material, a glass plate, cellulose acetate, cellulose nitrate, polyester film such as polyethylene terephthalate, polyamide film, polycarbonate film, polystyrene film, and the like. These support materials may be arbitrarily selected according to the purpose for which is used the silver halide photographic light-sensitive material of the present invention.

The coating process for use in coating the silver halide emulsion layers and nonlight-sensitive layers of the light-sensitive material of the present invention includes such various processes as the dipping coating process, air-doctor coating process, curtain coating process, hopper coating process, and the like.

The silver halide used for the silver halide emulsion of the present invention includes those arbitrarily used for ordinary silver halide emulsions: silver bromide, silver chloride, silver iodobromide, silver chlorobromide, silver chloroidobromide, and the like. The particles of these silver halides are allowed to be either coarse-grained or fine-grained, and be of either wide or narrow particle-size distribution.

The crystal of these silver halide particles may be either regular or twin, and those having an arbitrary proportion of its [100] face to [111] face can be used. Further the crystal structure of these silver halide particles may be either homogeneous from the inside to the outside thereof or heterogeneous between the inside and the outside thereof. Furthermore, these silver halides may be either of the type of forming a latent image mainly on the surface of the particles thereof or of the type of forming it inside the particles thereof. In addition, these silver halides may be prepared by any of the neutral method, ammoniacal method and acid method, and silver halide particles produced by any of the simultaneous mixing method, sequential mixing method and conversion method may be applied.

The silver halide emulsion of the present invention can be chemically sensitized by the single or combined use of sulfur sensitizers such as, e.g., aryl-thiocarbamide, thiourea, cystine, etc.; active or insert selenium sensitizers; reduction sensitizers such as, e.g., stannous salts, polyamides, etc.; noble-metallic sensitizers including such gold sensitizers as sodium aurithiocyanate, potassium chloroaurate, 2-aurosulfobenzothiazolemethyl chloride, etc., water-soluble-salt sensitizers such as of ruthenium, rhodium, iridium, etc., and ammonium chloropalladate, potassium chloropalladate, sodium chloropalladite, and the like.

Into the silver halide emulsion of the invention may be incorporated various known photographic additives such as those described in, e.g., Research Disclosure No. 17643, December 1978.

The silver halide emulsion of the invention, in order to be provided with sensitivity to the necessary wavelength region for a red-sensitive emulsion is spectrally sensitized by the addition thereto of an appropriately selected sensitizing dye. As the spectral sensitizer, various sensitizing dyes may be used singly or in combination.

Advantageously applicable spectral sensitizers to the invention include such typical cyanine dyes, merocyanine dyes, and complex cyanine dyes as described in U.S. Pat. Nos. 2,269,234, 2,270,378, 2,442,710 and 2,454,620.

Other additives may also be arbitrarily incorporated into the silver halide emulsion layers and nonlight-sensitive layers of the silver halide photographic light-sensitive material of the present invention, the additives including antifoggants, antistain agents, brightening agents, antistatic agents, hardening agents, plasticizers, wetting agents, ultraviolet absorbing agents, and the like, as described in Research Disclosure No. 17643.

The thus constructed silver halide photographic light-sensitive material of the present invention, after being exposed to light, is then developed by the color development process including various photographic processing procedures. The preferred color developer liquid usable in the invention is one that contains an aromatic primary amine-type color developing agent as the principal component thereof, the color developing agent being typified by p-phenylenediamine-type compounds including, for example, diethyl-p-phenylenediamine hydrochloride, monomethyl-p-phenylenediamine hydrochloride, dimethyl-p-phenylenediamine hydrochloride, 2-amino-5-diethylaminotoluene hydrochloride, 2-amino-5-(N-ethyl-N-dodecylamino)-toluene, 2-amino-5-(N-ethyl-N-β-methanesulfonamidoethyl-)aminotoluene sulfate, 4-(N-ethyl-N-β-methanesulfonamidoethylamino)-aniline, 4-(N-ethyl-N-β-hydroxyethylamino)aniline, 2-amino-5-(N-ethyl-β-methoxyethyl)aminotoluene, and the like.

These color developing agents may be used singly or in combination, or used together with hydroquinone or the like. Further, the color developer liquid contains generally alkali agents such as sodium hydroxide, ammonium hydroxide, sodium carbonate, sodium sulfite or the like, and may also contains various additives including such halogenated alkaline metals as, e.g., potassium bromide, and development control agents such as, e.g., hydrazinic acid, and the like.

The silver halide photographic light-sensitive material of the present invention may contain in the hydrophilic colloidal layers thereof the foregoing color developing agent as it is or in the form of the precursor thereof. The color developing agent precursor is a compound capable of producing a color developing agent under an alkaline condition, the precursor including aromatic aldehyde derivative-Schiff's base-type precursors, multivalent metallic ion complex precursors, phthalic acid imide derivative precursors, phosphoric acid imide derivative precursors, sugar-amine reaction product precursors and urethane-type precursors. These aromatic primary amine color developing agent precursors are as described in, e.g., U.S. Pat. Nos.

3,342,599, 2,507,114, 2,695,234, 3,719,493, British Pat. No. 803,783, Japanese Patent O.P.I. Publication Nos. 135628/1978 and 79035/1979, and Research Disclosure Nos. 15,159, 12,146 and 13,924. Any of these aromatic primary amine color developing agents or precursors thereof should be added in a quantity enough to obtain a sufficient color formation during the development process. The quantity largely differs according to the kind of the light-sensitive material used, but is used within the range of from about 0.1 mole to 5 moles, and preferably from 0.5 mole to 3 moles per mole of light-sensitive silver halide. These color developing agents or precursors may be used singly or in combination. Into the photographic light-sensitive material may be incorporated any of the foregoing compounds in the form of a solution of it dissolved into an appropriate solvent such as water, methanol, ethanol, acetone or the like, or in the form of a dispersed liquid of it with use of a high-boiling organic solvent such as dibutyl phthalate, dioctyl phthalate, tricresyl phosphate or the like, or in the form of it impregnated into a latex polymer as described in Research Disclosure No. 14850.

The silver halide photographic light-sensitive material of the present invention, after color development, is usually subjected to a bleach-fix bath processing or to separate bleaching and fixing treatments and then washed in water. As the bleaching agent, there may be used many compounds, among which multivalent metallic compounds such as of iron(III), cobalt(III), tin(II), and the like, especially complex salts of these metallic cations with organic acids, such as, for example, metallic complex salts, ferricyanates or dichromates of ethylenediamine-tetraacetic acid, nitrilotriacetic acid, aminopolycarboxylic acids such as N-hydroxyethylethylenediamine-diacetic acid, malonic acid, tartaric acid, malic acid, diglycolic acid, dithioglycolic acid, and the like, may be used singly or in combination.

According to the silver halide photographic light-sensitive material of the present invention, the solubility, dispersibility and dispersion stability of the cyan coupler of the invention contained in the silver halide emulsion layer are so good that no such trouble as deposition of the coupler will occur. The cyan coupler is excellent in the spectral absorbing characteristic as well as in the color tone and capable of forming a clear dye image in an extensive color reproduction range; particularly a cyan dye image having the maximum absorption in the wavelength range of form 640 to 660 nm and having little or no absorption in the regions of from 400 to 450 nm, from 450 to 480 nm, and from 500 to 550 nm, so that the coupler produces very excellent blue and green color reproductions with very satisfactory lightness with no trouble at all. Besides, the formed dye image is also excellent in the resistance to light, heat and moisture as well as in its preservability.

The present invention will be illustrated further in detail in reference to examples below, but embodiments of the present invention are not limited thereto.

EXAMPLE 1

The cyan couplers of the invention given in Table 1 and the following comparative couplers were used and 10 g of each of these couplers was added to a mixture of 5 ml of dibutyl phthalate with 30 ml of ethyl acetate, and completely dissolved by heating to 60° C. This solution was mixed with 5 ml of an aqueous 10% solution of Alkanol B (alkyl-naphthalenesulfonate, manufactured by DuPont) and 200 ml of an aqueous 5% gelatin solution, and this mixture was emulsified by means of a colloid mill to prepare a coupler-dispersed liquid. The thus dispersed liquids each was added to 500 g of a silver chlorobromide (containing 80 mole% silver bromide) emulsion, and the resulting emulsion was coated on a polyethylene-coated paper support and then dried, whereby 13 different monochromatic photographic elements were prepared. These samples were exposed through an optical wedge to light and subsequently processed in the baths given below in accordance with the following steps:

| Processing steps | Temperature | Time |
|---|---|---|
| Color developing | 30° C. | 3 min. & 30 sec. |
| Bleach-fix | 30° C. | 1 min. & 30 sec. |
| Washing | 30° C. | 2 min. |

Compositions of the respective processing liquids are as follows:

| Composition of the color developer: | |
|---|---|
| 4-amino-3-methyl-N—ethyl-N—(β-methanesulfonamidoethyl)-aniline sulfate | 5.0 g |
| Benzyl alcohol | 15.0 ml |
| Sodium hexametaphosphate | 2.5 g |
| Anhydrous sodium sulfite | 1.85 g |
| Sodium bromide | 1.4 g |
| Potassium bromide | 0.5 g |
| Borax | 39.1 g |
| Water to make 1 liter | |
| Use sodium hydroxide to adjust the pH to 10.3 | |
| **Composition of the bleach-fix bath:** | |
| Iron-ammonium ethylenediamine-tetraacetate | 61.0 g |
| Diammonium ethylenediamine-tetraacetate | 5.0 g |
| Ammonium thiosulfate | 124.5 g |
| Sodium metabisulfite | 13.5 g |
| Anhydrous sodium sulfite | 2.7 g |
| Water to make 1 liter | |

The thus processed samples each was tested for the spectral reflection characteristics and preservability thereof in the following manners:

Spectral reflection characteristics test:

(i) Reflection maximum wavelength (λmax): The wavelength at which the reflection density becomes maximum was tested by use of Hitachi Color Analyzer Model 607.

(ii) Reduction density (D): Reflection densities at the wavelengths λ of 550 nm, 470 nm and 420 nm when the maximum density is 2.0 by use of the same color analyzer as in (i).

(iii) Lightness (L*): Measurements were made in accordance with the Japanese Industrial Standard JIS Z 8729-1980.

Dye image stability tests:

(iv) Light stability: Each of the resulting dye images was exposed to the light of 45,000 luxes of a xenon fadometer over a period of 150 hours, and after that the residual density at the initial density of 1.0 was measured.

(v) Dark stability: After storing the samples at 77° C. in the dark for two weeks, the residual density of each of the samples at the initial density of 1.0 was measured.

The results obtained in (i)–(v) are given together in Table 1.

Comparative Compound-1

-continued

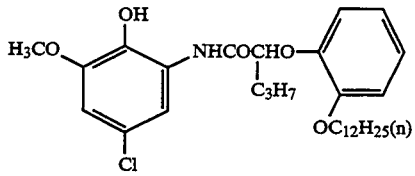

Comparative Compound-2

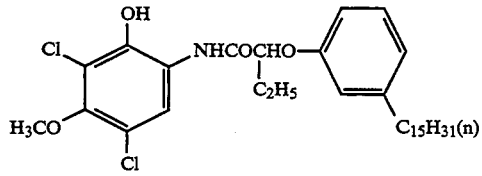

Comparative Compound-3

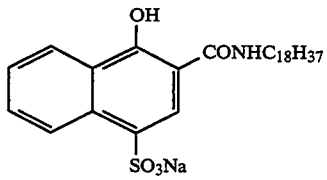

resulting in the formation of a dye image having a high lightness and satisfactory spectral reflection characteristics. This is quite an unexpected multiplied effect obtained due to the use of the cyan couplers having Formula [II]. And the formed dye image displays very satisfactory results in respect of the resistance to light and dark stability.

EXAMPLE 2

The cyan couplers of the present invention and the comparative couplers shown in Table 1 were used, and 0.1 mole of each of the couplers was added to and dissolved by heating to 60° C. into a mixture liquid of 20 ml of dibutyl phthalate and ethyl acetate. The necessary quantity of the ethyl acetate for the dissolution was measured. The results are as shown in Table 2. The thus obtained coupler solutions each was then mixed with the same aqueous Alkanol B solution as in Example 1 and an aqueous gelatin solution, and the mixture was emulsified by means of a colloid mill to thereby prepare a coupler-dispersed liquid. The coupler-dispersed liquid was subsequently added to 1000 ml of a red-sensitive silver chlorobromide emulsion (containing 70 mole% of silver bromide) containing photographic additives such as a hardening agent, coating aid, and the like, whereby a coating liquid for making a red-sensitive emulsion layer. These coupler-dispersed liquid-containing silver

| | Cyan coupler compositions | | | Spectral reflection density | | | | | Dye image stability | | |
|---|---|---|---|---|---|---|---|---|---|---|---|
| | | | | | D | | | | | | |
| Sample No. | Exemplified couplers of Formula (I) and mole % | Exemplified couplers of Formula (II) and mole % | Comparative Cyan cou - plers and mole % | λmax | λ = 550 | λ = 470 | λ = 420 | L* | Light stability | Dark stability | |
| 1 | I-5, 100 | — | — | 650 | 1.22 | 0.38 | 0.74 | 39.3 | 0.79 | 0.98 | Comparative Invention |
| 2 | I-5, 80 | II-3, 20 | — | 650 | 1.04 | 0.29 | 0.78 | 43.5 | 0.87 | 0.97 | Comparative Invention |
| 3 | I-5, 60 | II-3, 40 | — | 650 | 1.01 | 0.28 | 0.80 | 44.4 | 0.91 | 0.95 | Comparative Invention |
| 4 | I-5, 80 | II-1, 20 | — | 650 | 1.03 | 0.29 | 0.79 | 43.7 | 0.88 | 0.96 | Comparative Invention |
| 5 | I-37, 100 | — | — | 655 | 1.15 | 0.43 | 0.76 | 37.6 | 0.38 | 0.99 | Comparative Invention |
| 6 | I-37, 80 | II-3, 20 | — | 653 | 1.02 | 0.31 | 0.80 | 42.0 | 0.77 | 0.97 | Comparative Invention |
| 7 | I-4, 100 | — | — | 640 | 1.31 | 0.39 | 0.74 | 37.0 | 0.61 | 0.98 | Comparative Invention |
| 8 | I-4, 60 | II-3, 40 | — | 647 | 1.08 | 0.30 | 0.78 | 42.3 | 0.84 | 0.97 | Comparative Invention |
| 9 | — | II-3, 100 | — | 650 | 1.02 | 0.27 | 0.94 | 45.0 | 0.91 | 0.64 | Comparative Invention |
| 10 | — | II-1, 100 | — | 650 | 1.02 | 0.27 | 0.94 | 45.2 | 0.92 | 0.65 | Comparative Invention |
| 11 | — | — | C-1, 100 | 647 | 1.05 | 0.35 | 0.97 | 38.4 | 0.71 | 0.63 | Comparative Invention |
| 12 | I-5, 60 | — | C-1, 40 | 649 | 1.04 | 0.35 | 0.98 | 38.5 | 0.72 | 0.87 | Comparative Invention |
| 13 | — | — | C-2, 100 | 644 | 1.11 | 0.35 | 0.95 | 37.2 | 0.73 | 0.59 | Comparative Invention |
| 14 | I-5, 60 | — | C-2, 40 | 648 | 1.07 | 0.36 | 0.94 | 37.6 | 0.73 | 0.87 | Comparative Invention |
| 15 | — | — | C-3, 100 | 700 | 0.90 | 0.33 | 0.88 | 39.4 | 0.42 | 0.81 | Comparative Invention |
| 16 | I-5, 60 | — | C-3, 40 | 667 | 1.01 | 0.35 | 0.85 | 39.2 | 0.51 | 0.88 | Comparative Invention |

As apparent from the results shown in Table 1, the silver halide color photographic light-sensitive material samples of the present invention have little undesirable absorptions in 550 nm and 420 nm and low reflection minimum densities as compared to the silver halide color photographic light-sensitive material samples containing compounds having Formula [I] alone, thus halide emulsion coating liquids each, being kept at a temperature of 40° C., was flowed at a rate of 2 liters per minute for 48 hours through stainless tubing with its internal diameter of 5 cm by use of a circulation pump, and the time of a deposit beginning to attach to the inside wall of the tubing and the attached quantity of the deposit two days later were measured. The obtained results are as given in Table 2. As apparent from the results shown in Table 2, the cyan couplers of the present invention are very excellent in the solubility, dispersibility and dispersion stability.

TABLE 2

| Sample No. | Cyan coupler composition: Exemplified couplers of Formula (I) and mole % | Exemplified couplers of Formula (II) and mole % | Comparative cyan couplers and mole % | Necessary quantity of ethyl acetate for dissolution (ml) | Time of beginning deposition | Quantity of deposition (mg/1000 m²) | |
|---|---|---|---|---|---|---|---|
| 15 | I-5, 100 | — | — | 170 | 3 hrs later | 1540 | Comparative Invention |
| 16 | I-5, 80 | II-3, 20 | — | 110 | 16 hrs later | 210 | Comparative Invention |
| 17 | I-5, 60 | II-3, 40 | — | 100 | 18 hrs later | 180 | Comparative Invention |
| 18 | I-5, 80 | II-1, 20 | — | 100 | 17 hrs later | 190 | Comparative Invention |
| 19 | I-37, 100 | — | — | 160 | 4 hrs later | 1420 | Comparative Invention |
| 20 | I-37, 80 | II-3, 20 | — | 120 | 17 hrs later | 190 | Comparative Invention |
| 21 | I-4, 100 | — | — | 150 | 2 hrs later | 1660 | Comparative Invention |
| 22 | I-4, 60 | II-3, 40 | — | 100 | 15 hrs later | 220 | Comparative Invention |
| 23 | — | II-3, 100 | — | 100 | 18 hrs later | 190 | Comparative Invention |
| 24 | — | II-1, 100 | — | 90 | 17 hrs later | 180 | Comparative Invention |
| 25 | — | — | C-1, 100 | 80 | 20 hrs later | 120 | Comparative Invention |
| 26 | I-5, 60 | — | C-1, 40 | 150 | 5 hrs later | 1370 | Comparative Invention |
| 27 | — | — | C-2, 100 | 90 | 19 hrs later | 190 | Comparative Invention |
| 28 | I-5, 60 | — | C-2, 40 | 160 | 7 hrs later | 1460 | Comparative Invention |

EXAMPLE 3

The following layers were coated on a polyethylene-coated paper support in the described order from the support side to thereby prepare multicolor photographic element samples.

First layer:

An yellow coupler-containing blue sensitive silver halide emulsion (a silver chlorobromide emulsion containing 90 mole% of silver bromide and 300 g of gelatin per mole of silver halide and also containing 0.5 mole per mole of silver halide of an yellow coupler YC-1 dissolved into dibutyl phthalate and dispersed into the emulsion) is coated so that the coating quantity of gelatin is 2 g/m², and then dried.

Second layer:

A first interlayer (a gelatin layer of 1.5 g of gelatin/m²).

Third layer:

A magenta coupler-containing green-sensitive silver halide emulsion (a silver chlorobromide emulsion containing 80 mole% of silver bromide and 400 g of gelatin per mole of silver halide and also containing 0.3 mole per mole of silver halide of the following magenta couple MC-1 dissolved into dibutyl phthalate and dispersed into the emulsion) is coated so that the coating quantity of gelatin is 2 g/m², and then dried.

Fourth layer:

An ultraviolet absorbing agent-containing second interlayer (containing the following ultraviolet absorbing agent UV-1: a solution of the agent dissolved into 20 g of dibutyl phthalate is dispersed into gelatin, and the dispersed liquid is coated so that the coating quantity of the agent is 0.6 g/m² and that of gelatin is 1.5 g/m², and then dried.).

Fifth layer:

Cyan coupler-containing red-sensitive silver halide emulsions [silver chlorobromide emulsion containing 80 mole% of silver bromide and 300 g of gelatin per mole of silver halide] into parts of which emulsions are dispersed separately dibutyl phthalate solutions of the cyan couplers of the invention Ex emplified couplers having Formula [I] and [II], respectively, and into the other parts of which emulsion are dispersed separately the same comparative couplers-1 or -2 as in Example 1, respectively, (the individual quantities of the respective couplers are given in mole% to the total amount of all the cyan couplers in Table 3), the emulsions containing 0.4 mole per mole of silver halide of the above couplers, respectively) each is coated so that the coating quantity of gelatin is 20 g/m², and then dried.

Sixth layer:

A protective layer (a gelatin layer of 1.5 g of gelatin/m²).

The thus prepared samples 29–42 each was exposed to blue, green, and red lights through a wedge by use of a sensitometer (Model KS-7, manufactured by Konishiroku Photo Ind. Co., Ltd.), and then processed in the following baths in accordance with the processing steps given below:

| Processing steps (32.8° C.) | Processing time |
|---|---|
| Color developing | 3 min. & 30 sec. |
| Bleach-fix | 1 min. & 30 sec. |
| Washing | 3 min. & 30 sec. |
| Drying | |

Composition of the color developer:

| | |
|---|---|
| N—ethyl-N—β-methanesulfonamidoethyl-3-methyl-4-aminoaniline sulfate | 4.0 g |
| Hydroxyamine sulfate | 2.0 g |
| Potassium carbonate | 25.0 g |

-continued

| | |
|---|---|
| Sodium chloride | 0.1 g |
| Sodium bromide | 0.2 g |
| Anhydrous sodium sulfate | 2.0 g |
| Benzyl alcohol | 10.0 ml |
| Polyethylene glycol (average polymerization degree: 400) | 3.0 ml |
| Water to make 1 liter | |
| Use sodium hydroxide to adjust the pH to 10.0. | |

Composition of the bleach-fix bath:

| | |
|---|---|
| Iron-ammonium ethylenediamine-tetra-acetate | 60.0 g |
| Ammonium thiosulfate | 100.0 g |
| Sodium hydrogensulfate | 20.0 g |
| Sodium metabisulfite | 5.0 g |
| Water to make 1 liter | |
| Use sulfuric acid to adjust the pH to 7.0 | |

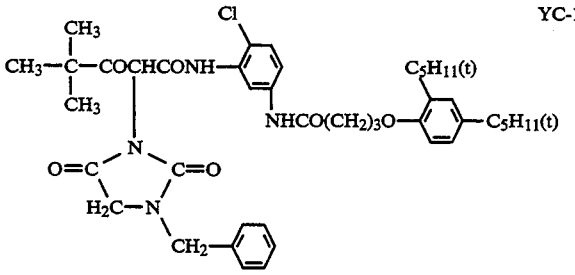

YC-1

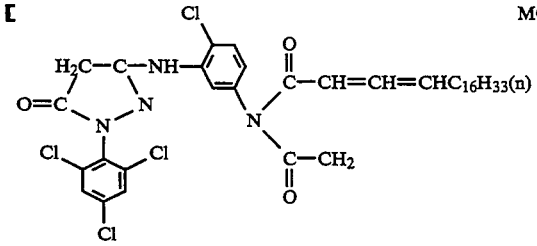

MC-1

-continued

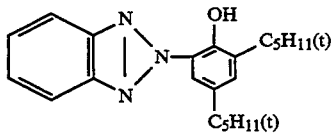

UV-1

The thus processed samples were tested for the evaluation of the color-reproducible region thereof and for the dye image preservability thereof.

Color-reproducible region evaluation tests:

In accordance with the method for representing colors by the L*, u* and v* systems specified by the Japanese Industrial Standard JIS Z 8729-1980, a chromaticity diagram of u′ and v′, when L* is equal to 50, was prepared for each of the samples to thereby evaluate the color-reproducible region (as integrated value) from the relative areas formed by the yellow, magent and cyan dyes. Further, the color area formed by the formed cyan and magenta dyes was regarded as the blue-reproduced region, the color area formed by the formed cyan and yellow dyes as the green-reproduced region, and the color area formed by the formed magenta and yellow dyes as the red-reproduced region, and these respective color-reproduced regions were evaluated from the relative areas thereof.

Image preservability tests:

The formed yellow (Y), magenta (M) and cyan (C) dye images were tested for the light stability and the dark stability in the same manners as in Example 1.

The results obtained from the above tests are as given together in Table 3.

TABLE 3

| Sample No. | Cyan coupler composition: Exemplified couplers of Formula (I) and mole % | Exemplified couplers of Formula (II) and mole % | Comparative cyan couplers and mole % | Color-reproducible region: overall | blue | green | red | Light stability: C | M | Y | Dark stability: C | M | Y | |
|---|---|---|---|---|---|---|---|---|---|---|---|---|---|---|
| 29 | I-5, 100 | — | — | 102 | 122 | 84 | 100 | 0.77 | 0.89 | 0.88 | 0.98 | 0.99 | 0.98 | Comparative Invention |
| 30 | I-5, 80 | II-3, 20 | — | 112 | 121 | 98 | 100 | 0.87 | 0.88 | 0.88 | 0.97 | 0.98 | 0.97 | Comparative Invention |
| 31 | I-5, 60 | II-3, 40 | — | 114 | 120 | 99 | 100 | 0.90 | 0.90 | 0.87 | 0.95 | 0.99 | 0.97 | Comparative Invention |
| 32 | I-5, 80 | II-1, 20 | — | 112 | 121 | 98 | 100 | 0.89 | 0.89 | 0.88 | 0.96 | 0.99 | 0.98 | Comparative Invention |
| 33 | I-37, 100 | — | — | 95 | 118 | 83 | 100 | 0.40 | 0.88 | 0.87 | 0.99 | 0.98 | 0.98 | Comparative Invention |
| 34 | I-37, 80 | II-3, 20 | — | 109 | 117 | 99 | 100 | 0.80 | 0.90 | 0.88 | 0.97 | 0.99 | 0.98 | Comparative Invention |
| 35 | I-4, 100 | — | — | 99 | 120 | 85 | 100 | 0.62 | 0.89 | 0.89 | 0.98 | 0.99 | 0.97 | Comparative Invention |
| 36 | I-4, 60 | II-3, 40 | — | 111 | 119 | 100 | 100 | 0.85 | 0.90 | 0.89 | 0.97 | 0.99 | 0.98 | Comparative Invention |
| 37 | — | II-3, 100 | — | 100 | 100 | 100 | 100 | 0.90 | 0.91 | 0.88 | 0.64 | 0.98 | 0.97 | Comparative Invention |
| 38 | — | II-1, 100 | — | 100 | 100 | 100 | 100 | 0.90 | 0.90 | 0.88 | 0.65 | 0.98 | 0.97 | Comparative Invention |
| 39 | — | — | C-1, 100 | 92 | 95 | 91 | 100 | 0.71 | 0.88 | 0.88 | 0.62 | 0.99 | 0.99 | Comparative Invention |
| 40 | I-5, 60 | — | C-1, 40 | 93 | 97 | 87 | 100 | 0.71 | 0.88 | 0.88 | 0.84 | 0.98 | 0.97 | Comparative Invention |
| 41 | — | — | C-2, 100 | 90 | 95 | 90 | 100 | 0.74 | 0.88 | 0.89 | 0.60 | 0.98 | 0.98 | Comparative Invention |
| 42 | I-5, 60 | — | C-2, 40 | 92 | 98 | 86 | 100 | 0.73 | 0.88 | 0.89 | 0.86 | 0.99 | 0.98 | Comparative Invention |
| 43 | — | — | C-3, 100 | 91 | 96 | 91 | 100 | 0.44 | 0.85 | 0.88 | 0.81 | 0.99 | 0.98 | Comparative |

TABLE 3-continued

| Sample No. | Cyan coupler composition: Exemplified couplers of Formula (I) and mole % | Exemplified couplers of Formula (II) and mole % | Comparative cyan couplers and mole % | Color-reproducible region: overall | blue | green | red | Light stability: C | M | Y | Dark stability: C | M | Y | |
|---|---|---|---|---|---|---|---|---|---|---|---|---|---|---|
| 44 | I-5, 60 | — | C-3, 40 | 93 | 103 | 84 | 100 | 0.52 | 0.86 | 0.87 | 0.88 | 0.99 | 0.98 | Invention Comparative Invention |

As apparent from Table 3, the multicolor photographic elements which use the cyan couplers of the present invention show much improved blue color reproductions with clear dye images formed in a wide color reproduction region without any adverse effect on the green color reproduction, and further show well-balanced degree of cyan-magenta-yellow discoloration, thus showing much improved dye image stability on the whole.

EXAMPLE 4

Monochromatic photographic element samples were prepared in the same manners as in previous examples with the exception that Exemplified Couplers I-16, I-36, I-33, II-4 and II-5 were used in place of the I-5, I-37, I-4, II-3 and II-1, respectively, and Comparative Couplers-4, -5 and -6 in place of the Comparative Couplers-1, -2 and -3.

The thus obtained 14 different samples were used for the same tests as in Example 1. As a result, the silver halide color photographic light-sensitive material samples of the present invention have less undesirable absorptions in 550 nm and 420 nm and lower reflection minimum densities than do the silver halide color photographic light-sensitive material samples containing those of Formula [I] alone, so that the samples of the present invention form high lightness and satisfactory spectral reflection characteristics—having dye images. And the formed dye images display very satisfactory light stability and dark stability characteristics.

Comparative Coupler-4

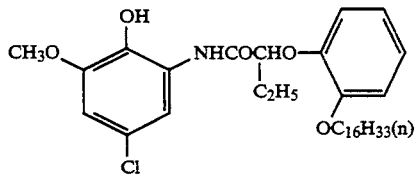

Comparative Coupler-5

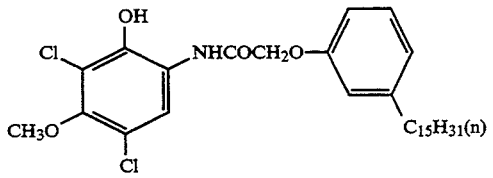

Comparative Coupler-6

-continued

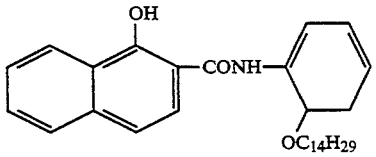

EXAMPLE 5

Similar multicolor photographic element samples to the multicolor photographic element samples of Example 3 were prepared in the same manners as in Example 3 with the exception that the exemplified couplers were replaced by those used in Example 4, respectively, and the YC-1, MC-1 and UV-1 were replaced by the following YC-2, MC-2 and UV-2, respectively.

The thus obtained 14 different samples were subjected to the same tests as in Example 3. As a result, the cyan couplers of the present invention—used multicolor photographic element samples show improved red, green and blue color reproductions, particularly the conspicuous improvement on the blue-color reproduction, with clear dye image formed in a wide color reproduction region, and also show well-balanced degree of cyan-magenta-yellow discoloration, thus showing much improved image preservability on the whole.

YC-2

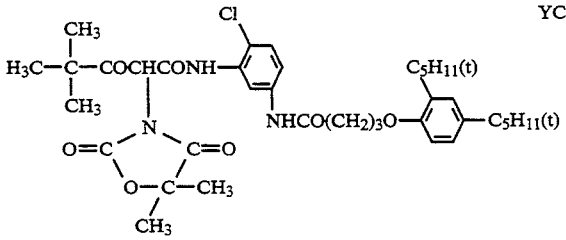

MC-2

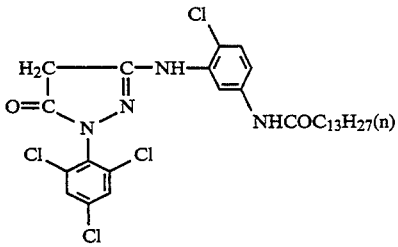

UV-2

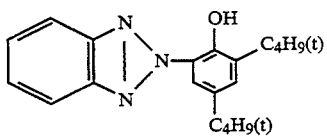

What is claimed is:

1. A silver halide photographic light-sensitive material comprising a support having thereon at least one silver halide emulsion layer containing in combination at least one of those cyan couplers having the following Formula [I] and at least one of those cyan couplers having the following Formula [II]:

Formula I

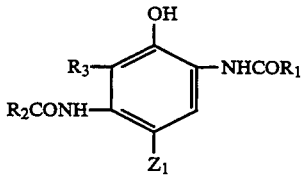

wherein $R_1$ is an aryl radical, a cycloalkyl radical or a heterocyclic radical; $R_2$ is an alkyl radical, a phenyl radical, or $R_8$—X-$R_9$—$_n$ wherein $R_8$ represents an alkyl or aryl radical, $R_9$ represents an alkylene radical, n represents an integer of 0 to 5, and X represents a divalent radical selected from the group consisting of —O—, —CO—, —COO—, —OCO—, —$SO_2$NR'—, —NR'$SO_2$NR"—, —S—, —SO— and —$SO_2$—, wherein R' and R" represent an alkyl radical; $R_3$ is a hydrogen atom, a halogen atom, an alkyl radical or an alkoxy radical; and $Z_1$ is a hydrogen atom, a halogen atom, or a radical that can be split off by the reaction of said coupler with the oxidized product of an aromatic primary amine-type color developing agent, Formula II

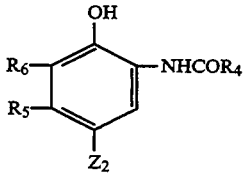

wherein $R_4$ is an alkyl radical or

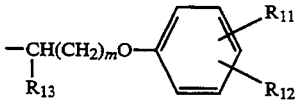

wherein $R_{11}$ and $R_{12}$ may be either the same or different from each other and each is a hydrogen atom, an alkyl radical or an alkoxy radical, provided that the sum of the carbon atoms or $R_{11}$ and $R_{12}$ is from 8 to 16, $R_{13}$ is a hydrogen atom or an alkyl radical, and m is an integer of 0 to 2; $R_5$ is an alkyl radical; $R_6$ is a hydrogen atom, a halogen atom, or an alkyl radical; and $Z_2$ is a hydrogen atom, a halogen atom, or a radical that can be split off by the reaction of said coupler with the oxidized product of an aromatic primary amine-type color developing agent, *wherein said silver halide emulsion layer does not contain an aromatic primary amine-type color developing agent or a precursor thereof.*

2. The light-sensitive material of claim 1, wherein the aryl radical represented by $R_1$ in Formula [I] is a phenyl radical.

3. The light-sensitive material of claim 1, wherein the cyan couplers having Formula [I] are those compounds having the following formula [III]:

Formula [III]

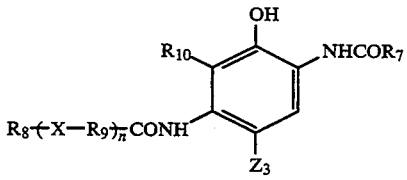

wherein $R_7$ represents a phenyl radical, $R_8$ represents an alkyl or aryl radical, $R_9$ represents an alkylene radical, $R_{10}$ represents a hydrogen atom or a halogen atom, n represents an integer of 0 to 5, X represents a divalent radical selected from the group consisting of —O—, —CO—, —COO—, —OCO—, —$SO_2$NR'—, —NR'$SO_2$NR"—, —S—, —SO— and —$SO_2$— wherein R' and R" represent an alkyl radical and $Z_3$ represents a hydrogen atom, a halogen atom, or a radical that can be split off by the reaction of the coupler with the oxidized product of an aromatic primary amine-type color developing agent.

4. The light-sensitive material of claim 3, wherein the alkylene radical represented by $R_9$ has carbon atoms of 1–12.

5. The light-sensitive material of claim 3, wherein X represents —O—, —S—, —SO— or —$SO_2$—.

6. The light-sensitive material of claim 3, wherein $Z_3$ represents a chlorine atom or a fluorine atom.

7. The light-sensitive material of claim 3, wherein $R_7$ represents a phenyl radical substituted by an alkyl-sulfonamide or aryl-sulfonamide radical, alkyl-sulfamoyl, or aryl-sulfamoyl.

8. The light-sensitive material of claim 3, wherein $R_8$ represents a phenyl radical substituted by an alkyl-sulfonamide or aryl-sulfonamide radical, alkyl-sulfamoyl or aryl-sulfamoyl.

9. The light-sensitive material of claim 3, wherein $R_9$ represents a penta fluoro phenyl radical.

10. The silver halide photographic light-sensitive material of claim 1, wherein the cyan couplers having the Formula [II] are the compounds having the following Formula [IV]:

Formula [IV]

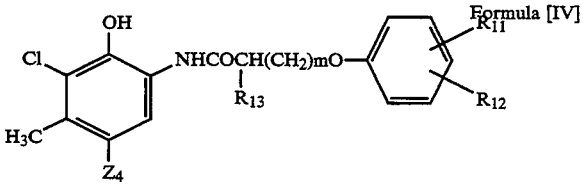

wherein $R_{11}$ and $R_{12}$ may be either the same or different from each other and each is a hydrogen atom, an alkyl radical or an alkoxy radical, provided that the sum of the carbon atoms of $R_{11}$ and $R_{12}$ is from 8 to 16; $R_{13}$ is a hydrogen atom or an alkyl radical; m is an integer of 0 to 2; and $Z_4$ is a hydrogen atom, a halogen atom, or a radical that can be split off by the reaction of the coupler with the oxidized product of an aromatic primary amine-type color developing agent.

11. The light-sensitive material of claim 10, wherein the alkyl radicals represented by $R_1$ and $R_{12}$ in Formula [IV] are butyl radicals or amyl radicals, respectively.

12. The light-sensitive material of claim 10, wherein the alkyl radical represented by $R_{13}$ in Formula [IV] is an ethyl radical or a butyl radical.

13. The light-sensitive material of claim 10, wherein the halogen atom represented by $Z_4$ in Formula [IV] is a chlorine atom.

14. The light-sensitive material of claim 1, wherein the cyan coupler having Formula [I] out of the total quantity of the cyan couplers being contained in the silver halide emulsion layer is used in a quantity sufficient to account for from 30 to 90 mole percent.

15. The light-sensitive material of claim 14, wherein the cyan coupler having Formula [I] out of the total quantity of the cyan couplers being contained in the silver halide emulsion layer is used in the quantity sufficient to account for from 50 to 90 mole percent.

16. The light-sensitive material of claim 1, wherein the cyan coupler having Formula [I] and that having Formula [II] are respectively contained in the quantity within the range of from 0.1 to 1 mole thereof per mole of silver halide.

17. The light-sensitive material of claim 1, wherein the support has thereon a cyan dye image-formable component unit consisting of at least one red-sensitive silver halide emulsion layer containing in combination a cyan coupler having Formula [I] and a cyan coupler having Formula [II] of claim 1; a magenta dye image-formable component unit consisting of at least one green-sensitive halide emulsion layer containing at least one magenta dye forming coupler; and a yellow dye image-formable component unit consisting of at least one blue-sensitive silver halide emulsion layer containing at least one yellow dye forming coupler.

18. The light-sensitive material of claim 17, wherein the yellow dye image forming coupler is a compound having the following Formula [V]:

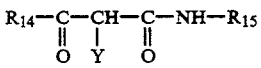

Formula [V]

wherein $R_{14}$ represents an alkyl radical or an aryl radical $R_{15}$ represents an aryl radical; and Y represents a hydrogen atom or a radical which can be split off during the course of a color developing reaction.

19. The light-sensitive material of claim 17, wherein the yellow dye forming coupler is a compound having the following Formula [VI]:

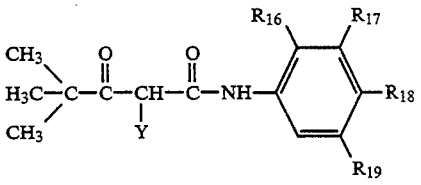

Formula [VI]

wherein $R_{16}$ is a halogen atom, an alkoxy radical or an aryloxy radical; $R_{17}$, $R_{18}$ and $R_{19}$ each is a hydrogen atom, a halogen atom, an alkyl radical, an alkenyl radical, an alkoxy radical, an aryl radical, an aryloxy radical, a carbonyl radical, a sulfonyl radical, a carbonyl radical, an alkoxycarbonyl radical, a carbonyl radical, a sulfone radical, a sulfamyl radical, a sulfonamido radical, an acylamido radical, an ureido radical or an amido radical; and Y is as defined in Formula [V] of claim 18.

20. The light-sensitive material of claim 17, wherein the magenta dye forming coupler is a compound having the following Formula [VII]:

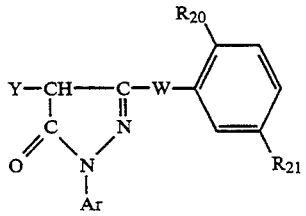

Formula [VII]

wherein Ar is an aryl radical; $R_{20}$ is a hydrogen atom, a halogen atom, an alkyl radical or an alkoxy radical; $R_{21}$ is an alkyl radical, an amido radical, an imido radical, an N-alkyl-carbamoyl radical, an N-alkyl-sulfamoyl radical, an alkyloxy-carbonyl radical, an acyloxy radical, a sulfonamido radical, or a urethane radical; Y is as defined in Formula [V] of claim 18; and W is —NH—, —NHCO— wherein the N atom is bonded with the carbon atom of the pyrazolone nucleus or —NH-CONH—.

* * * * *

UNITED STATES PATENT AND TRADEMARK OFFICE

CERTIFICATE OF CORRECTION

PATENT NO. : Re 34,697

DATED : August 16, 1994

INVENTOR(S) : Shun TAKADA et al.

It is certified that error appears in the above-indentified patent and that said Letters Patent is hereby corrected as shown below:

Claim 1, column 31, line 19, change "$R_8$-X-$R_9$-n" to --$R_8$-(X-$R_9$)$_n$--.

Claim 18, column 33, lines 42-43, after "aryl radical" to --;--.

Signed and Sealed this

Eleventh Day of April, 1995

Bruce Lehman

*Attest:*

BRUCE LEHMAN

*Attesting Officer*

*Commissioner of Patents and Trademarks*